No. 680,917. Patented Aug. 20, 1901.
C. H. S. HELLING.
COVER FOR POTS, KETTLES, &c.
(Application filed May 6, 1901.)
(No Model.)
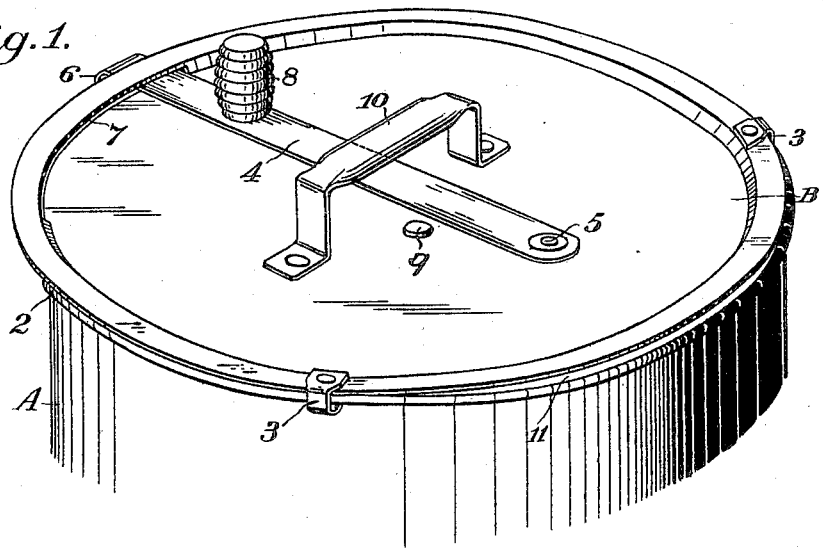
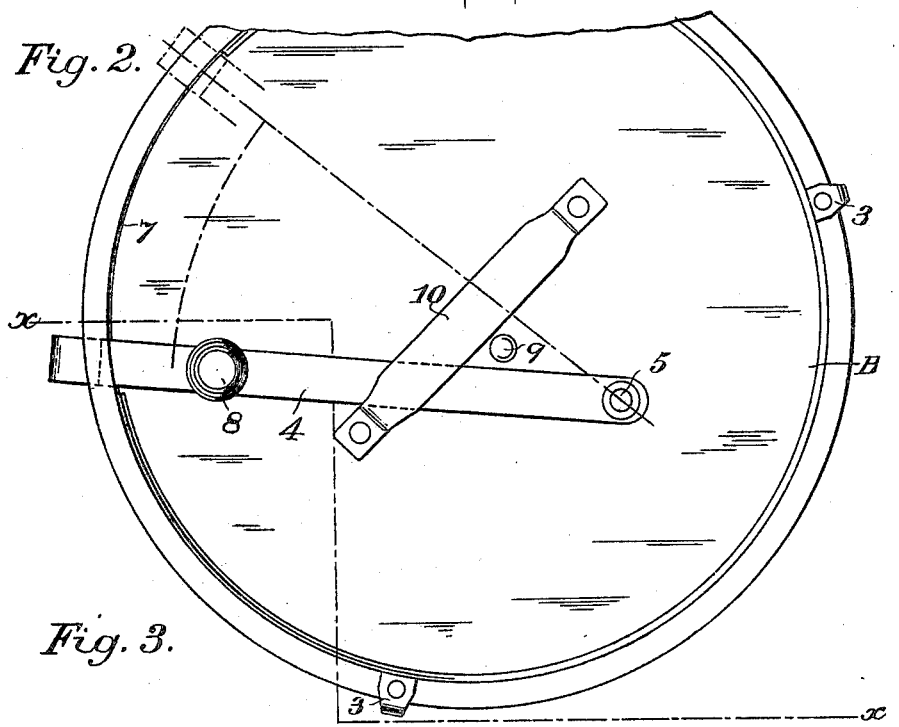
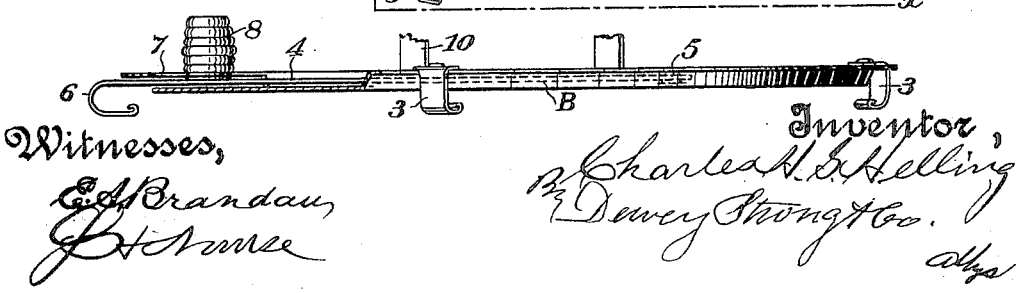

UNITED STATES PATENT OFFICE.

CHARLES H. S. HELLING, OF ALAMEDA, CALIFORNIA.

COVER FOR POTS, KETTLES, &c.

SPECIFICATION forming part of Letters Patent No. 680,917, dated August 20, 1901.

Application filed May 6, 1901. Serial No. 58,883. (No model.)

*To all whom it may concern:*

Be it known that I, CHARLES H. S. HELLING, a citizen of the United States, residing at Alameda, county of Alameda, State of California, have invented an Improvement in Covers for Pots, Kettles, &c.; and I hereby declare the following to be a full, clear, and exact description of the same.

My invention relates to improvements in cooking-utensil attachments.

It consists of a cover adapted to rest upon a pot, kettle, or like receptacle having projecting lugs or hooks by which the edge of the pot may be engaged and a lever pivoted eccentrically of said cover and having its outer end provided with a projecting lug or hook adapted to engage the edge of the pot opposite to the first-named lugs, whereby the cover may be firmly locked on the pot.

It also comprises details of construction which will be more fully hereinafter set forth, having reference to the accompanying drawings, in which—

Figure 1 is a perspective view of my invention, showing its application. Fig. 2 is a plan. Fig. 3 is a part section and part edge elevation taken at the line $x\ x$ of Fig. 2.

The object of my invention is to provide a cover of simple construction that can be locked on a pot or kettle, as above described, so the contents thereof may be held in when it is desired to invert said receptacle, as in draining off surplus water, which is frequently necessary during the operation of cooking.

A represents a pot of ordinary construction and provided with the usual annular flange or lip 2.

B represents the body of my improved cover, which may be of any desired material or design.

Upon the edge of the cover are the lugs or hooks 3, separated a suitable distance and adapted to engage the lip 2 on the pot.

4 is a lever, preferably of spring material, pivoted at 5 between the two lugs and eccentrically of the cover. The lugs 3 are, as shown, located at one side of a line drawn diametrically across the cover, and the outer or free end of the lever is upon the opposite side of said line, whereby when the lever is operated the cover is locked to the pot and a segmental pouring-opening is formed, as I will hereinafter indicate. The outer end of this lever is provided with a downward hook extension 6. The length of the lever is such generally that the inner side of the hook 6 will be practically tangential to the cover, which said lever has been moved upon the diameter passing through the pivot 5. A guide is provided near or on the outer periphery of the cover, by which the oscillation of the lever is limited. This guide is here shown as a slot 7 in the upturned outer annular portion of the cover, and through which slot the lever operates. A knob 8 enables the lever to be moved readily, and a stop 9, projecting slightly above the cover and adapted to frictionally engage the lever, prevents the lever oscillating too freely. A handle 10 is secured to the cover and spans the lever, so as not to interfere with the movement of the lever.

In operation the cover is placed upon a pot, with the lever thrown off the line of the diameter of the cover and the lip engaged by the lugs 3. By the "line of the diameter" is meant the diameter passing through the pivot-point 5. The lever is then moved toward this diametral line, whereupon the hook portion 6 of the lever engages the side of the pot beneath the flange thereof, and so finally locks the cover on the pot. The hooks 3 are so constructed and disposed as to project beyond the edge of the cover, whereby said cover will when it is locked on the pot have that portion of its periphery between the hooks 3 and opposite to the hook 6 inside of the inner wall of the pot, forming with the pot a segmental opening 11. Through this opening the liquid is allowed to escape, while the clamped cover holds in the solid contents of the pot.

It is understood that this cover may be used as and for the purposes of any ordinary cover.

Having thus described my invention, what I claim as new, and desire to secure by Letters Patent, is—

1. A cover consisting of a body or disk portion having downwardly-projecting members upon its periphery of such length as to permit the cover to move horizontally to expose a pouring-opening, a lever pivoted on said disk and eccentric thereof, and movable in a plane parallel therewith, the outer end of said lever projecting beyond the periphery of said disk and located at one side of a line drawn diametrically across the cover and the said members disposed upon the opposite side of said line, said lever provided with a downward extension.

2. A cover consisting of a circular body or disk portion having downwardly-projecting members upon its periphery, a lever eccentrically pivoted upon said disk, said lever having its outer end extending beyond the periphery of the disk and located at one side of a line drawn diametrically across the cover and said member located upon the opposite side of said line, said lever having a downward projection on said outer end, and a guide upon said disk whereby the oscillation of the lever is limited.

3. The combination with a kettle or like receptacle of a cover having projecting members thereon adapted to engage the outer edge of the kettle in such manner as to form a segmental opening between the wall of the kettle and the shorter portion of the periphery of the cover between said members, a lever pivoted on said cover and eccentrically thereof and having its free end located upon one side of a line drawn diametrically across the cover and said members disposed upon the other side of said line, guides on said cover in which said lever is movable, a stop by which the movement of the lever is regulated, said lever having its outer end provided with a downward extension which is adapted to engage the side of the kettle opposite to the first-named members when the lever is oscillated, and whereby said cover is locked upon the kettle.

In witness whereof I have hereunto set my hand.

CHARLES H. S. HELLING.

Witnesses:
S. H. NOURSE,
JESSIE C. BRODIE.